United States Patent
Wang et al.

(10) Patent No.: US 10,162,202 B2
(45) Date of Patent: Dec. 25, 2018

(54) TRANSFER PLATE FOR FORMING ALIGNMENT FILMS ON MOTHERBOARD HAVING UNIT DISPLAY SCREENS

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Hui Wang, Beijing (CN); Chun Wang, Beijing (CN); Junsheng Chen, Beijing (CN); Xiaohe Li, Beijing (CN); Chuncheng Che, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 118 days.

(21) Appl. No.: 14/895,463

(22) PCT Filed: May 5, 2015

(86) PCT No.: PCT/CN2015/078266
§ 371 (c)(1),
(2) Date: Dec. 2, 2015

(87) PCT Pub. No.: WO2016/110029
PCT Pub. Date: Jul. 14, 2016

(65) Prior Publication Data
US 2016/0363790 A1    Dec. 15, 2016

(30) Foreign Application Priority Data
Jan. 9, 2015    (CN) .......................... 2015 1 0012631

(51) Int. Cl.
*G02F 1/13*    (2006.01)
*G02F 1/1333*    (2006.01)
(Continued)

(52) U.S. Cl.
CPC .......... *G02F 1/1303* (2013.01); *G02F 1/1333* (2013.01); *G02F 1/1337* (2013.01);
(Continued)

(58) Field of Classification Search
CPC combination set(s) only.
See application file for complete search history.

(56) References Cited

U.S. PATENT DOCUMENTS 5,361,150 A * 11/1994 Noguchi ............... G02F 1/1309
349/139
7,307,686 B2    12/2007 Jang
(Continued)

FOREIGN PATENT DOCUMENTS

CN    1847960 A    10/2006
CN    1896812 A    1/2007
(Continued)

OTHER PUBLICATIONS

Office Action in Chinese Patent Application No. 201510012631.X, dated Dec. 23, 2016.
(Continued)

*Primary Examiner* — Lauren Nguyen
(74) *Attorney, Agent, or Firm* — Brooks Kushman P.C.

(57)    ABSTRACT

The disclosure provides a transfer plate, a display screen, a display device and a method for manufacturing a display device. The transfer plate includes a print region and a non-print region, and the print region includes multiple print sub-units which are arranged in a one-to-one correspondence with multiple unit display screens of a motherboard. Each print sub-unit is provided with a mark region, and the (Continued)

mark regions are for forming marks on the respective unit display screens while forming alignment films on the respective unit display screens of the motherboard, to identify the respective unit display screens of the motherboard.

13 Claims, 6 Drawing Sheets (51) Int. Cl.
    *G02F 1/1337* (2006.01)
    *G02F 1/1341* (2006.01)

(52) U.S. Cl.
    CPC ...... *G02F 1/1341* (2013.01); *G02F 1/133351* (2013.01); *G02F 2001/133354* (2013.01)

(56) References Cited

U.S. PATENT DOCUMENTS

| | | | | |
|---|---|---|---|---|
| 2001/0012089 A1* | 8/2001 | Shiraishi | ............... | C03B 33/076 349/153 |
| 2006/0146268 A1* | 7/2006 | Jang | ...................... | G02F 1/1333 349/158 |
| 2010/0014043 A1* | 1/2010 | Ootaguro | .............. | G02F 1/1339 349/154 |

FOREIGN PATENT DOCUMENTS

| | | |
|---|---|---|
| CN | 102768439 A | 11/2012 |
| CN | 103777407 A | 5/2014 |
| CN | 203705774 U | 7/2014 |
| CN | 203849526 U | 9/2014 |
| CN | 104536209 A | 4/2015 |
| KR | 20080002567 A | 1/2008 |
| KR | 2020080002567 U | 7/2008 |

OTHER PUBLICATIONS

Written Opinion of the International Searching Authority.
Second Office Action for Chinese Application No. 201510012631.X, dated Nov. 15, 2017, 6 Pages.

\* cited by examiner

TRANSFER PLATE FOR FORMING ALIGNMENT FILMS ON MOTHERBOARD HAVING UNIT DISPLAY SCREENS

CROSS-REFERENCE TO RELATED APPLICATION

The present application is the U.S. national phase of PCT Application No. PCT/CN2015/078266 filed on May 5, 2015, which claims a priority to Chinese Patent Application No. 201510012631.X filed on Jan. 9, 2015, the disclosure of which is incorporated in its entirety by reference herein.

TECHNICAL FIELD

The present disclosure relates to the field of displaying technology, in particular to a transfer plate, a display screen, a display device and a method for manufacturing a display device.

BACKGROUND

Figure 1:
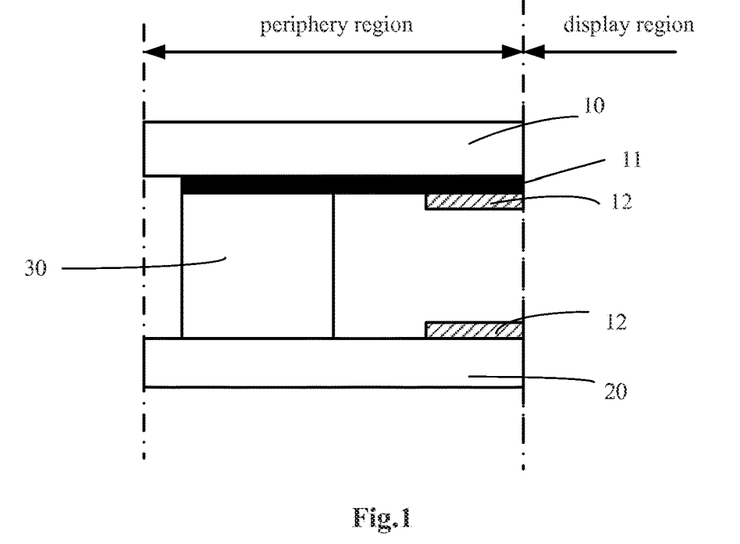
FIG. 1 is a schematic sectional view of a periphery region of an existing liquid crystal display.

In the field of displaying technology, the liquid crystal display is widely used due to advantages such as small volume, low power consumption, free of radiation and high resolution. FIG. 1 is a schematic sectional view of a periphery region of a liquid crystal display. As shown in FIG. 1, a common liquid crystal display includes a color film substrate 10 and an array substrate 20 which are arranged opposite to each other, and a liquid crystal layer (not shown in the figure) provided between the two substrates. A periphery of the color film substrate 10 and a periphery of the array substrate 20 are adhered via a sealant 30. A black matrix 11 and an alignment film 12 are provided at the side of the color film substrate 10, and the array substrate is provided with an alignment film 12. A display region of the liquid crystal display is completely covered by the alignment films 12. In addition, the area of coverage of the alignment films 12 is usually larger that the area of the display region, to ensure that the display region is completely covered by the alignment films.

Generally, one motherboard includes multiple unit display screens. For the producer of display panel, the more unit display screens obtained by cutting a same motherboard is, the higher the production-line profitability is. To distinguish respective unit display screens, each unit display screen is marked with a Panel ID (mark) during the manufacture. Since the Panel IDs for respective unit displays are different, currently, a main approach in the production-line is marking the respective unit displays successively by using a laser pen. If the number of unit display screens in one motherboard glass is small, the work of Panel ID marking is relative simple and little productivity of the production-line is taken. However, if the number of unit display screens in one motherboard glass is relative large, the work of Panel ID marking is relative complicated and much productivity of the production-line is taken. Particularly, sizes of unit display screens manufactured via respective generational lines of panels currently turn smaller and smaller, there are hundreds of unit display screens on a substrate of a motherboard glass, and the work of Panel ID marking turns relative hard. Sometimes the Panel IDs are not marked in consideration of the productivity of the production-line; in this way, issues occurring in latter manufacturing processes cannot be traced back to former processes, thereby greatly decreasing efficiency of the production-line. On another hand, periphery regions of display screens having small sizes currently turn smaller and smaller, and the Panel IDs may occupy some space; hence, it is urgent to provide an effective approach for marking Panel IDs on displays having small sizes.

SUMMARY

The present disclosure intends to provide a transfer plate, a display screen, a display device and a method for manufacturing a display device, which can improve a current efficiency in marking unit display screens in the production-line and may effectively improve the productivity of the production-line.

Technical solutions provided in the present disclosure are given as follows.

A transfer plate is provided to form alignment films on a motherboard having multiple unit displays. The transfer plate includes a print region and a non-print region, and the print region includes multiple print sub-units which are arranged in a one-to-one correspondence with the multiple unit display screens of the motherboard. The multiple print sub-units are respectively provided with different mark regions, and the mark regions are used to form marks on the respective unit display screens while forming the alignment films on the respective unit display screens of the motherboard, to identify the respective unit display screens of the motherboard.

Further, the print sub-unit includes:
an effective pattern region, completely overlapping a display region of a corresponding unit display screen; and
a peripheral pattern region, surrounding the effective pattern region and partially overlapping a periphery region of the corresponding unit display screen;
wherein the mark regions are arranged in the peripheral pattern regions and are configured to form the marks in the periphery regions of the respective unit display screens.

Further, each unit display screen includes an electrode side. The mark regions are arranged in the peripheral pattern regions of the respective print sub-units corresponding to the electrode sides of the respective unit display screens.

Further, the print sub-units protrude from a surface of the non-print region, and surfaces of the peripheral pattern regions of the print sub-units are concave to form the mark regions.

Further, the effective pattern regions and positions of the peripheral pattern regions corresponding to patterns of the to-be-formed marks are convex, and the non-print region and positions of the peripheral pattern regions other than the positions corresponding to the to-be-formed marks are concave.

Further, the periphery region of the unit display screen comprises a sealant region configured to apply a sealant; and the mark region is arranged corresponding to a region between the sealant region and the display region of the unit display screen.

Further, a minimum distance from the mark formed by the mark region to the display region of a corresponding unit display screen is 0.5 mm.

Further, a minimum distance from the mark formed by the mark region to the sealant region of a corresponding unit display screen is 0.2 mm.

Further, an accuracy of the mark region 0.2 mm.

A display screen includes two substrates arranged opposite to each other. Each of the two substrates is provided with an alignment film, at least one of the two substrates is provided with a mark for identifying the display screen and distinguishing the display screen from other display screens in a same motherboard, and the mark and the alignment film is formed integrally.

Further, the alignment film includes:
an effective film region completely overlapping a display region of the display screen; and
a peripheral film region, surrounding the effective film region and partially overlapping a periphery region of the display screen;
where the mark is arranged in the peripheral film region.

Further, the display includes an electrode side, and the mark is arranged in the peripheral film region corresponding to the electrode side.

Further, the peripheral film region of the alignment film is partially hollowed to form the mark.

Further, the display region of the display screen is covered by the alignment film, the mark in the periphery region of the display screen is a thin film pattern made of the same material as the alignment film, and the mark and the alignment film are arranged in a same layer.

Further, a sealant is provided in the periphery region of the display screen, and the mark is arranged between the sealant and the display region of the display screen.

Further, a minimum distance from the mark to the display region is 0.5 mm.

Further, a minimum distance from the mark to the sealant is 0.2 mm.

Further, an accuracy of the mark is 0.2 mm.

A display device includes the above-described display.

A method for manufacturing a display device include
forming marks on respective unit display screens of a motherboard while forming alignment films on respective unit display screens by applying the transfer plate according to any one of claims 1-9, to identify the respective unit display screens of the motherboard.

Beneficial effects of the present disclosure are given as follows.

With the above solutions, by modifying the structure of the transfer plate and arranging the mark regions in the print region of the transfer plate, all unit display screens of one motherboard are marked while forming the alignment films on the motherboard. Hence, the current, efficiency in marking respective unit display screens in the production-line is improved.

DETAILED DESCRIPTION OF THE EMBODIMENTS

Principle and characteristics of the present disclosure are described hereinafter in conjunction with drawings. Used examples are merely to explain the present disclosure, rather than to limit the scope of the present disclosure.

Unless specific definitions are further given, technical terms or scientific terms used herein refer to normal meanings which can be understood by ordinary skilled in the field to which the present disclosure relates. Terms such as "first" and "second" used in the specification and the list of claims of the present disclosure do not indicate any order, numbers or differences importance, and are merely used to distinguish different components. Similarly, terms such as "one" or "a" represent there exist at least one, rather than to limit the number. Terms such as "connected with" or "connected to" do not limit to physical or mechanical connections, and can include electrical connections which may be direct or indirect. Terms of "above", "below", "left", and "right" are merely used to describe a relative position relationship; if the absolute position of one described object alters, the relative position relationship of the described object alters correspondingly.

Considering the technical problems in conventional technologies that a work of marking unit panels of a motherboard with Panel IDs is complicated and much productivity of production-line is taken, the present disclosure provides a transfer plate, a display screen, a display device and a method for manufacturing a display device, which can improve a current efficiency in marking unit display screens in the production-line and may effectively improve the productivity of the production-line through simple design and alterations.

Figure 2:
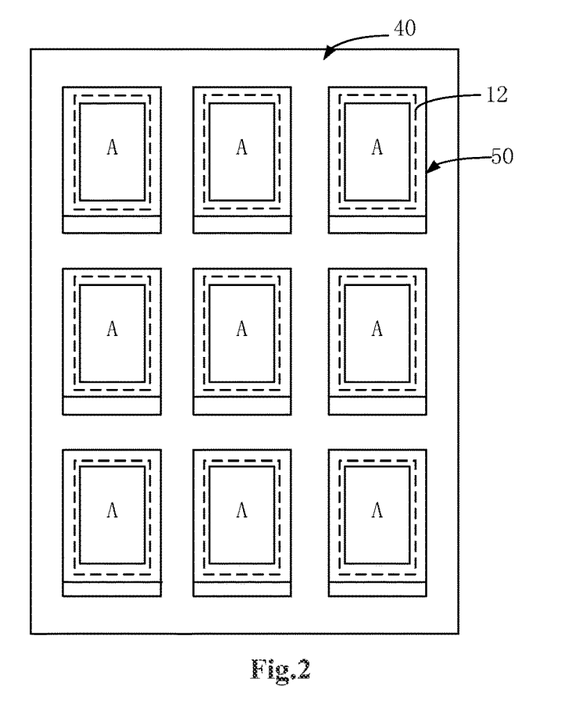
FIG. 2 schematically shows arrangement of unit display screens of a motherboard.
Figure 3:
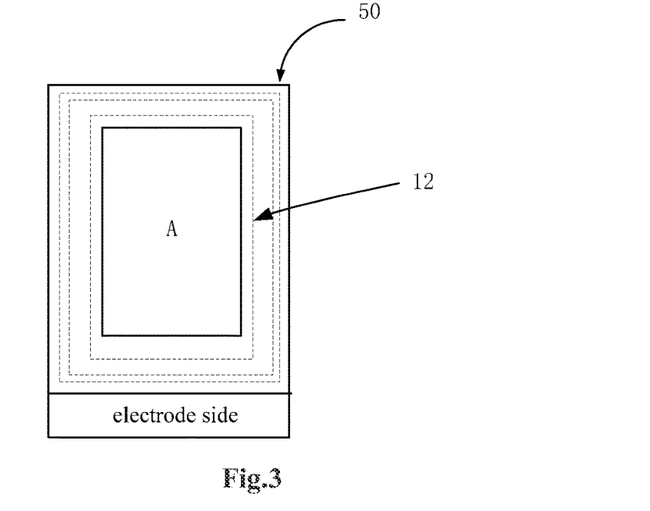
FIG. 3 schematically shows a plan structure of one unit display screen of an existing motherboard.

FIG. 2 schematically shows arrangement of unit display screens of a motherboard glass, and FIG. 3 schematically shows a plan structure of one unit display. As shown in FIG. 2 and FIG. 3, one motherboard 40 includes multiple unit display screens 50. A display region A of each unit display 50 is covered by an alignment film 12. The alignment films 12 on the respective unit display screens 50 are all printed onto the motherboard 40 through a same transfer plate (for example, Asahikasei Photosensitive Resin).

A device for forming the alignment films on the motherboard mainly includes: a supporter for supporting the motherboard, a first transfer roller, a second transfer roller, and a transfer plate covering the second transfer roller. When printing the alignment films, the first transfer roller transfers a solution (e.g., Polymide solution, where Polymide is abbreviated as PI) onto the second transfer roller, and the transfer plate covering the second transfer roller transfers the PI solution onto the motherboard through rotation of the second transfer roller.

Figure 4:
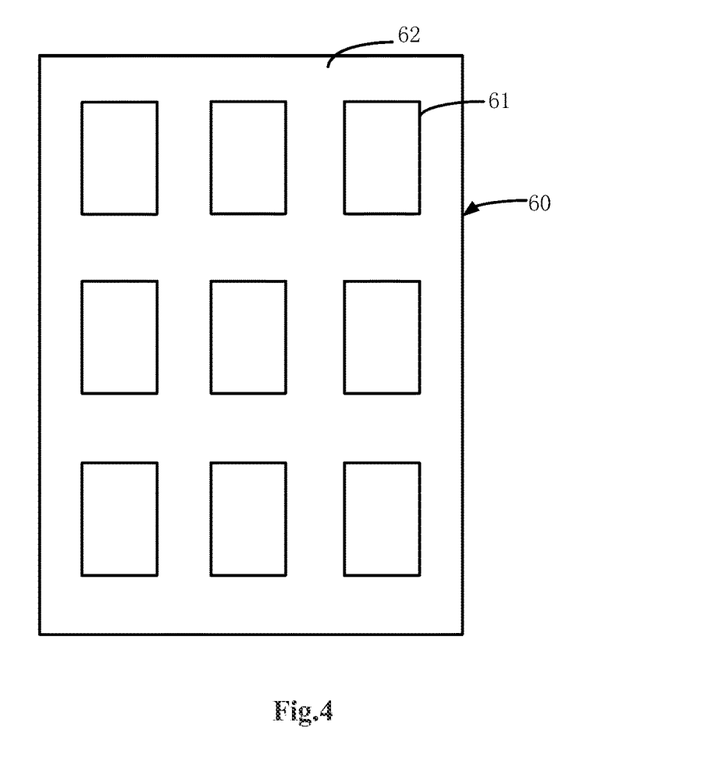
FIG. 4 is a schematic structural diagram of an existing transfer plate.

FIG. 4 is a schematic structural diagram of the transfer plate. As shown in FIG. 4, the transfer plate includes a print region and a non-print region 62. The print region includes print sub-units 61 which are corresponding to the respective unit display screens of the motherboard. The print sub-units 61 are covered by the PT solution and transfer the PI solution onto the motherboard 40, thereby forming the alignment films 12. Patterns of the alignment films 12 are determined by the print sub-units 61 of the transfer plate. The print sub-units 61 of the transfer plate may be designed into different shapes and sizes to match different unit display screens 50. The non-print region 62 of the transfer plate corresponds to regions of the unit display screens where not covered by the alignment films 12.

Figure 5:
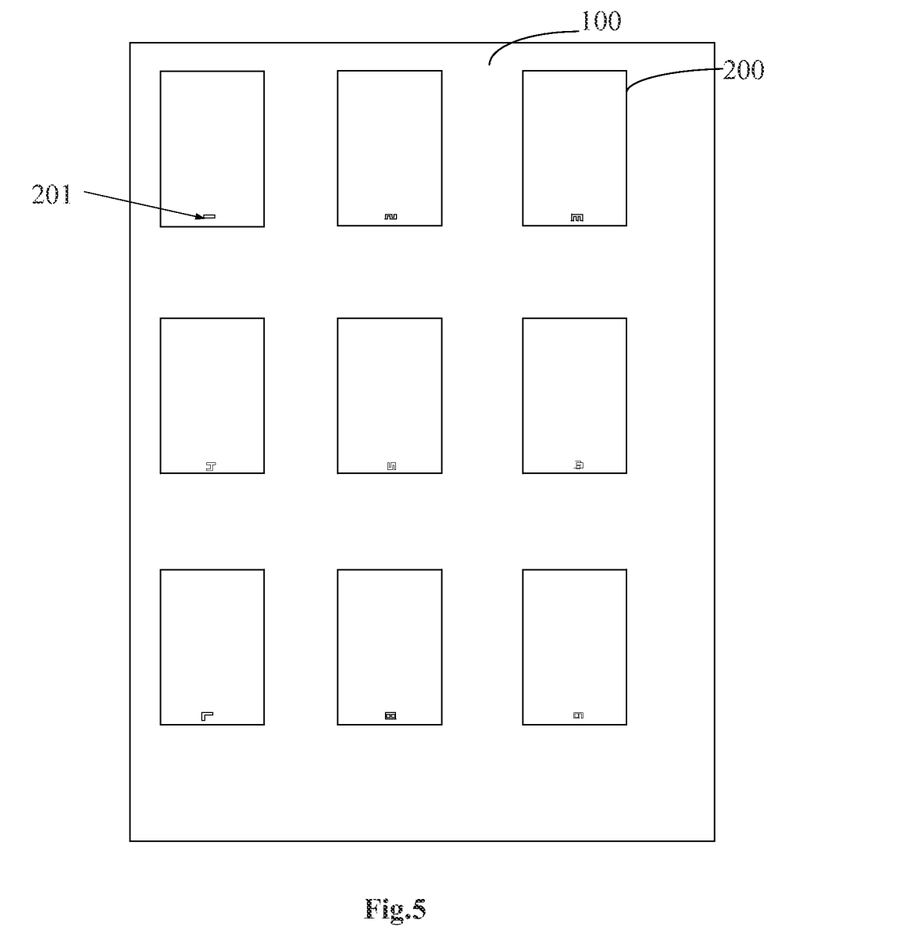
FIG. 5 is a schematic structural diagram of a transfer plate provided in the present disclosure.

FIG. 5 illustrates a transfer plate provided in the present disclosure. The transfer plate is for forming alignment films on a motherboard having multiple unit display screens. The transfer plate includes a print region and a on-print region 100. The print region includes multiple print sub-units 200 which are corresponding to the multiple unit display screens of the motherboard. The print sub-units 200 are respectively provided with different mark regions 201 for forming marks on the respective unit display screens simultaneously while forming the alignment films on the respective unit display screens of the motherboard, to identify the respective unit display screens of the motherboard.

In the above-described solution, the structure of the transfer plate is modified, and the mark regions 201 for forming marks on the motherboard are arranged in the respective print sub-units 200 of the transfer plate. In this way, marks can be formed on the respective unit display screens of the motherboard through the transfer plate simultaneously while printing the alignment films onto the motherboard. Hence, the respective unit display screens of one motherboard are marked such that the respective unit display screens of the same motherboard can be distinguished, thereby improving the current efficiency in marking respective unit display screens in the production-line and effectively improving the productivity of the production-line.

According to an embodiment of the present disclosure, optionally, each of the multiple print sub-units 200 includes:
an effective pattern region which can completely overlap the display region of a corresponding unit display screen; and
a peripheral pattern region, which surrounds the effective pattern region and can partially overlap the periphery region of a corresponding unit display screen.

The mark regions 201 are arranged in the peripheral pattern regions, for forming the marks in the periphery regions of the respective unit display screens.

When applying the above solution, in order to ensure that the display region of the display screen is completely covered by the alignment flint, an area of coverage of the print sub-unit 200 is larger than an area of the display region of the unit display screen. The mark region 201 is formed in a portion (i.e. the peripheral pattern region) of the print sub-unit 200 where exceeding the display region of the corresponding unit display screen; accordingly, the mark is finally formed in the periphery region of the unit display screen and may not influence the display effect of the display region.

In addition, the Panel ID of a conventional display screen is formed on the display screen through laser. The Panel ID needs to occupy space of the periphery region of the display screen. For products having narrow borders, e.g., cell phones, borders of the display screen are narrow and cannot satisfy the requirement for space of the Panel ID; however, making the borders wider is not in accordance with the current trend of narrow-border. As shown in FIG. 3, an existing display screen usually includes an electrode side, where the electrode side has a largest space among the periphery of the display screen and borders of the other three sides are all smaller than the electrode side. Hence, according to an embodiment of the present disclosure, optionally, the mark regions 201 are arranged in the peripheral pattern regions of the respective print sub-units 200 corresponding to electrode sides of the respective unit display screens.

In the above solution, by arranging the mark regions 201 in the peripheral pattern regions of the respective print sub-units 200 corresponding to the electrode sides of the respective unit display screens, the marks can be formed at the electrode sides of the unit display screens, thereby solving the problem that the panel IDs of the unit display screens occupy too much space of the peripheries of the display screens, improving the productivity of the production-line, and meanwhile optimizing the design of space of the periphery regions of the display screens. It can be understood that in practical application, the mark regions 201 can be alternatively arranged in the peripheral pattern regions corresponding to the other three sides of the unit display screens.

In the present disclosure, optionally as shown in FIG. 5, the transfer plate applies a convex model, the print sub-units 200 protrude from a surface of the non-print region 100, and surfaces of the peripheral pattern regions of the print sub-units 200 are concave to form the mark regions 201.

Figure 6:
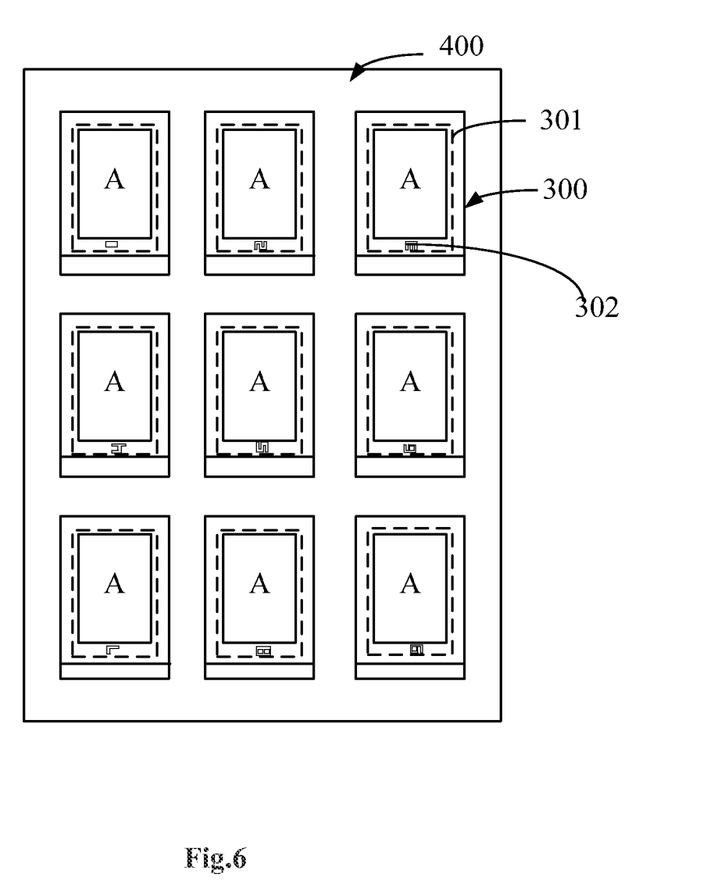
FIG. 6 is a schematic diagram of a motherboard printed and processed by a transfer plate provided in the present disclosure.

With the above solution, the surfaces of the peripheral pattern regions of the print sub-units 200 are concave to form the mark regions 201. When printing the alignment films on the motherboard, all regions of the respective print sub-units 200 other than the mark regions 201 are coated with the solution uniformly, and then the PI solution is transferred to the motherboard. Accordingly, as shown in FIG. 6, alignment films 301 are formed on unit display screens 300 of the motherboard 400 by the regions of the print sub-units 200 other than the mark regions 201, and hollowed marks 302 are formed at positions corresponding to the mark regions 201. According to the above solution merely needs to form mark regions 201 having same patterns as the marks by concaving the surfaces of the peripheral pattern regions of the print sub-units 200 of a conventional convex transfer plate, only simple modifications are made to the structure of the transfer plate; hence, the cost may not increase and the process is simple.

It should be noted that, the mark regions 201 pray be formed in other ways. For example, in the print sub-units, the effective pattern regions and positions of the peripheral pattern regions corresponding to patterns of the to-be-formed marks protrude, and the non-print region and positions of the peripheral pattern regions other than the positions corresponding to the to-be-formed marks are concave. In this way, when transferring the PI solution onto the motherboard by using the transfer plate, as shown in the figure, the alignment films are formed at positions corresponding to the effective pattern regions of the print sub-units, and marks made of the same material as the alignment films are formed at positions corresponding to protruding portions of the peripheral pattern regions.

In addition, it should be noted that, the transfer plate may app concaving model in practical application.

Figure 7:
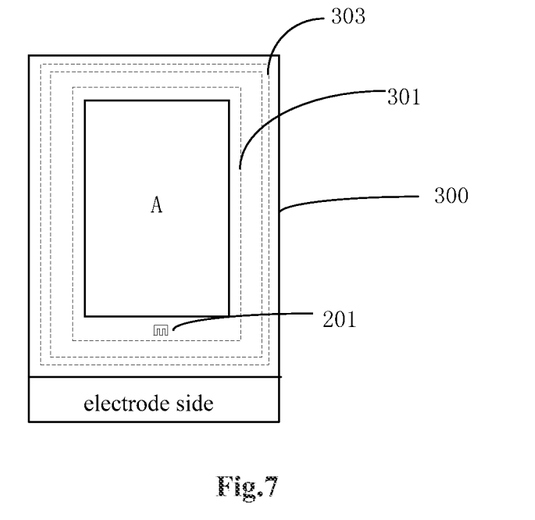
FIG. 7 schematically shows a plan view of one unit display screen shown in FIG. 6.

In addition, the display screen is formed by arranging two substrates oppositely to form a cell, and a sealant is provided at periphery regions of the two substrates. According to an embodiment of the present disclosure, optionally, as shown in FIG. 6 and FIG. 7, the periphery region of the unit display screen 300 includes a sealant region 303 for applying the sealant. The mark region 201 is arranged corresponding to a region between the sealant region 303 and the display region A of the unit display screen. Generally, the display screens are formed by cutting a motherboard including multiple unit display screens. With the above solution, on the motherboard, a distance from a cutting line for separating the unit display screen to the sealant is smaller than a distance from the sealant to the display region; the mark formed through the transfer plate according to embodiments of the present disclosure locates in the periphery region of the unit display screen and between the sealant and the display region of the unit display screen, thereby optimizing the design of space of the periphery region. Apparently it can be understood that, the present disclosure merely provides an optional position for arranging the mark region 201, while the disclosure is not limited thereto.

In addition, to ensure that printing of the alignment film in the display region of the unit display screen may not be influenced while forming the marks, according to an embodiment of the present disclosure, optionally, a minimum distance from the mark 302 to the display region of a corresponding unit display screen is 0.5 mm (that is, a distance d1 from the mark 302 to the display region A is at least 0.5 mm). Furthermore, considering that the accuracy of applying the sealant is ±0.2 mm, a minimum distance from the mark 302 to the sealant region 303 of a corresponding unit display screen is 0.2 mm (that is, a distance d2 from mark 302 to the sealant region 303 is at least 0.2 mm).

In addition, it should be noted that, as shown in FIG. 5, patterns of the mark regions 201 corresponding to the respective unit display screens may be 1, 2, 3 and the like. Considering that the printing accuracy of a current minimum size unit of the transfer plate is 0.2 mm, each mark region 201 can be regarded as formed with the size unit. Hence, when designing the transfer plate, the accuracy of the mark region 201 (i.e., the size of a narrowest portion of the pattern of the mark region 201) is 0.2 mm.

Figure 8:
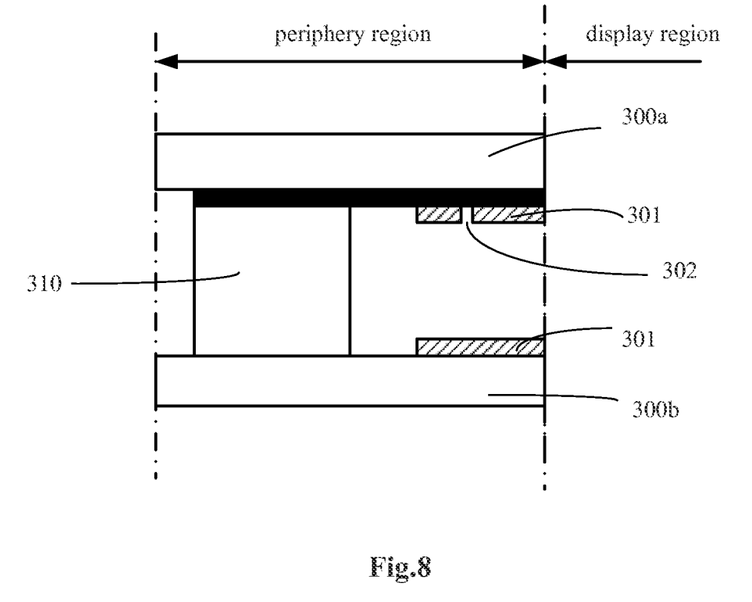
FIG. 8 is a schematic sectional view of a periphery region of a display screen according to an embodiment of the present disclosure.
Figure 9:
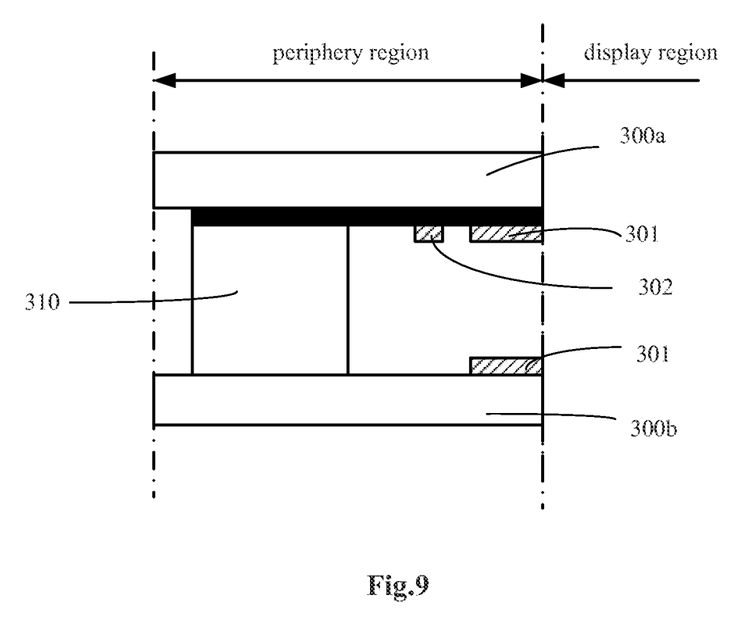
FIG. 9 is a schematic sectional view of a periphery region of a display screen according to an embodiment of the present disclosure.

A display screen is provided according to an embodiment of the present disclosure. FIG. 7 schematically shows a plan structure of a display according to an embodiment of the present disclosure. FIG. 8 is a schematic sectional view of a periphery region of a display screen according to a first embodiment of the present disclosure, and FIG. 9 is a schematic sectional view of a periphery region of a display screen according to a second embodiment of the present disclosure. As shown in FIG. 7-FIG. 9, the display screen includes two substrates arranged opposite to each other. Each of the two substrates is provided with an alignment film 301. At least one of the two substrates is provided with a mark 302, which is for identifying the display screen and distinguishing the display screen from other display screens of a same motherboard. The mark 302 and the alignment film 301 is formed integrally.

In the above solution, the mark 302 of the display screen and the alignment film 301 are formed integrally. The structure of a transfer plate for printing the alignment film 301 can be modified, mark regions 201 by which marks can be formed on the motherboard are arranged at respective print sub-units 200 of the transfer plate; hence, the marks 302 can be printed on the respective unit display screens of the motherboard via the transfer plate simultaneously while printing the alignment films 301 on the motherboard, such that the display screen can be distinguished from other unit display screens obtained from the same motherboard by the marks. Since the alignment film 301 and the mark 302 are formed integrally, the current efficiency in marking respective unit display screens in the production-line can be improved, and the productivity of the production-line can be effectively improved.

It should be noted that, the display screen provided in the present disclosure is a liquid crystal display screen, and the two substrates may be a color filter substrate 300a and an array substrate 300b. The mark 302 may be arranged on the color filter substrate, or may be arranged on the array substrate.

According to an embodiment of the present disclosure, optionally, as shown in FIG. 7 and FIG. 8, the alignment film 301 includes: an effective film region completely overlapping a display region of the display screen; and a peripheral film region, which surrounds the effective film region and partially overlaps a periphery region of a corresponding unit display screen. The mark 302 is arranged in the peripheral film region.

When applying the above solution, in order to ensure that the display region of the display screen is completely covered by the alignment film 301, an area of coverage of the alignment film 301 is larger than an area of the display region A of the display screen. The mark 302 is formed in the periphery region of the unit display screen and may not influence the effect of the display region A.

In addition, the Panel ID of a conventional display screen is formed on the display through laser. The Panel ID needs to occupy space of the periphery region of the display screen. For products having narrow borders, e.g., cell phones, borders of the display screen are narrow and cannot satisfy the requirement for space of the Panel ID; however, making the borders wider is not in accordance with the current trend of narrow-border. An existing display screen usually includes an electrode side, where the electrode side is a side having a largest space among the periphery of the display and borders of the other three sides are all smaller than the electrode side. Hence, according to an embodiment of the present disclosure, optionally, as shown in FIG. 7, the display screen includes an electrode side, and the mark region 201 is arranged in the peripheral film region corresponding to the electrode side.

In the above solution, by arranging the mark region 201 in the peripheral film region corresponding to the electrode side of the display screen, the problem that the panel ID of the display screen occupies too much space of the periphery of the display is solved, the productivity of the production-line is improved, and meanwhile the design of space of the periphery region of the display is optimized. It can be understood that in practical application, the mark region 201 can be alternatively arranged in the peripheral region where corresponding to the other three sides of the display.

In addition in the present disclosure, optionally as shown in FIG. 8, the peripheral film region of the alignment film 301 is partially hollowed to form the mark 302.

In the above solution, the peripheral film region of the alignment film 301 is partially hollowed and the pattern of the hollowed portion forms the mark 302. For the display screen provided in the above solution, the transfer plate for printing the alignment films 301 and the marks 302 may be a convex model, and it merely needs to form the mark regions 201 having same patterns as the marks 302 by concaving the surfaces of the peripheral pattern regions of print sub-units 200 of a convention convex transfer plate. Only simple modifications are made to the structure of the transfer plate; hence, the cost may not increase and the process is simple.

It should be noted that, the mark 302 can apply other structures. For example, as shown in FIG. 9, the display region A of the display screen is covered by the alignment film 301, the mark 302 in the periphery region of the display is a thin film pattern made of the same material as the alignment 301, and the mark 302 and the alignment film 301 are arranged in a same layer.

In addition, as shown in FIG. 7-FIG. 9, a sealant 310 is provided at the periphery region of the display screen. The mark 302 is arranged between the sealant 310 and the display region A of the display screen. In the above solution, a distance from an edge of the display screen to the sealant 310 is generally smaller than a distance from the sealant 310 to the display region A, the mark 302 locates between the sealant 310 and the display region A of the display, thereby optimizing the design of space of the periphery region. Apparently it can be understood that, the present disclosure merely provides an optional position for arranging the mark 302, while the disclosure is not limited thereto.

In addition, to ensure that printing of the alignment film 301 in the display region A of the display screen may not be influenced while forming the mark 302, according to an embodiment of the present disclosure, optionally, a minimum distance d1 from the mark 302 to the display region A is 0.5 mm. Furthermore, considering that the accuracy of applying the sealant 310 is ±0.2 mm, a minimum distance d2 from the mark 302 to the sealant 310 is 0.2 mm.

In addition, the present disclosure further provides a display device including the display screen provided in the present disclosure. Apparently, the display device provided in the present disclosure also have beneficial effects brought by the display screen provided in the present disclosure.

In addition, the present disclosure further provides a method for manufacturing a display device, which applies the transfer plate provided in the present disclosure to form marks 302 on respective unit display screens simultaneously while forming alignment films 301 on the respective unit display screens of a motherboard, to identify the respective unit display screens of the motherboard.

With the method for manufacturing the display device provided in the present disclosure, the marks 302 can be printed on the respective unit display screens of the motherboard by the transfer plate provided in the present disclosure simultaneously while forming the alignment films 301 on the motherboard including multiple unit display screens. Hence, the respective unit display screens of one motherboard can be distinguished from each other by the marks, the current efficiency in marking the respective unit display screens in the production-line is improved, and the productivity of the production-line is effectively improved.

The above-described embodiments are preferred embodiments of the present disclosure. It should be noted that, the ordinary skilled in the art can make various modifications and polishment without departing from the principle of the present disclosure, and all these modifications and polishment shall fall within the scope of protection of the present disclosure.

What is claimed is:

1. A transfer plate, configured to form alignment films on a motherboard having a plurality of unit display screens, the transfer plate comprising a print region and a non-print region, and the print region comprises a plurality of print sub-units arranged in a one-to-one correspondence with the plurality of unit display screens of the motherboard; and
wherein each of the plurality of print sub-units includes a mark region, and a mark formed in the mark region is configured to identify one of the unit display screens of the plurality of unit display screens and distinguish the one of the unit display screens from other of the unit display screens in the motherboard, and the mark and the alignment film are formed integrally.

2. The transfer plate according to claim 1, wherein each of the plurality of print sub-units comprises:
an effective pattern region, completely overlapping a display region of a corresponding unit display screen; and
a peripheral pattern region, surrounding the effective pattern region and partially overlapping a periphery region of the corresponding unit display screen;
wherein the mark regions are arranged in the peripheral pattern regions and are configured to form the marks in the periphery regions of the respective unit display screens.

3. The transfer plate according to claim 2, wherein each of the plurality of unit display screens comprises an electrode side, and the mark regions are arranged in the peripheral pattern regions of the respective print sub-units corresponding to the electrode sides of the respective unit display screens.

4. The transfer plate according to claim 2, wherein the print sub-units protrude from a surface of the non-print region, and surfaces of the peripheral pattern regions of the print sub-units are concaved to form the mark regions.

5. The transfer plate according to claim 2, wherein the effective pattern regions and positions of the peripheral pattern regions corresponding to patterns of the to-be-formed marks are convex, and the non-print region and positions of the peripheral pattern regions other than the positions corresponding to the to-be-formed marks are concave.

6. The transfer plate according to claim 1, wherein
the periphery region of the unit display screen comprises a sealant region configured to apply a sealant; and
the mark region is arranged corresponding to a region between the sealant region and the display region of the unit display screen.

7. The transfer plate according to claim 6, wherein a minimum distance from the mark formed by the mark region to the display region of a corresponding unit display screen is 0.5 mm.

8. The transfer plate according to claim 6, wherein a minimum distance from the mark formed by the mark region to the sealant region of a corresponding unit display screen is 0.2 mm.

9. The transfer plate according to claim 1, wherein an accuracy of the mark region is 0.2 mm.

10. A transfer plate, configured to form alignment films on a motherboard having a plurality of spaced apart unit display screens, the transfer plate comprising a print region and a non-print region adjacent the print region,
the print region comprising a plurality of spaced apart print sub-units, each of the print sub-units arranged in a one-to-one correspondence with a respective one of the plurality of unit display screens of the motherboard,
each of the print sub-units configured to form an alignment film on the respective one of the plurality of unit display screens of the motherboard, each of the print sub-units including a mark region, with a mark formed in the mark region being configured to identify one of the unit display screens of the plurality of unit display screens and distinguish the one of the unit display screens from other of the unit display screens in the motherboard, and the mark and the alignment film being formed integrally.

11. The transfer plate according to claim 10, wherein each of the print sub-units comprises:
an effective pattern region configured to completely overlap a display region of the respective one of the plurality of unit display screens; and
a peripheral pattern region surrounding the effective pattern region and configured to partially overlap a periphery region of the respective one of the plurality of unit display screens;

each mark region being disposed in a respective one of the peripheral pattern regions and configured to form the identifying serial number in the periphery region of the respective one of the plurality of unit display screens.

12. The transfer plate according to claim 11, wherein each of the plurality of unit display screens comprises an electrode side, each mark region being arranged in the peripheral pattern region of the respective print sub-units corresponding to a respective one of the electrode sides of the respective one of the plurality of unit display screens, the print sub-units protruding from a surface of the non-print region, each of the mark regions comprising a concave surface on the respective one of the peripheral pattern regions of the print sub-units.

13. The transfer plate according to claim 10, wherein
the periphery region of the unit display screen comprises a sealant region configured to apply a sealant; and
the mark region is arranged corresponding to a region between the sealant region and the display region of the unit display screen, wherein a minimum distance from the mark formed by the mark region to the display region of a corresponding unit display screen is 0.5 mm., and wherein a minimum distance from the mark formed by the mark region to the sealant region of a corresponding unit display screen is 0.2 mm.

* * * * *